United States Patent
Kameyama et al.

(10) Patent No.: US 8,684,085 B2
(45) Date of Patent: Apr. 1, 2014

(54) STORING DEVICE FOR STORED SUBSTANCE AND METHOD FOR STORING STORED SUBSTANCE

(75) Inventors: Hiromichi Kameyama, Tokyo (JP); Susumu Nishio, Tokyo (JP); Ziqiu Xue, Kizugawa (JP); Toshifumi Matsuoka, Kyoto (JP)

(73) Assignee: Tokyo Gas Co., Ltd., Tokyo (JP)

( * ) Notice: Subject to any disclaimer, the term of this patent is extended or adjusted under 35 U.S.C. 154(b) by 348 days.

(21) Appl. No.: 13/057,375

(22) PCT Filed: Aug. 12, 2009

(86) PCT No.: PCT/JP2009/064249
§ 371 (c)(1),
(2), (4) Date: Feb. 14, 2011

(87) PCT Pub. No.: WO2010/018844
PCT Pub. Date: Feb. 18, 2010

(65) Prior Publication Data
US 2011/0139455 A1      Jun. 16, 2011

(30) Foreign Application Priority Data
Aug. 14, 2008 (JP) ................................. 2008-208816

(51) Int. Cl.
*E21B 43/02* (2006.01)
*E21B 43/16* (2006.01)

(52) U.S. Cl.
CPC ............... *E21B 43/02* (2013.01); *E21B 43/164* (2013.01); *E21B 43/168* (2013.01)
USPC ............................. 166/309; 166/228; 166/276

(58) Field of Classification Search
CPC combination set(s) only.
See application file for complete search history.

(56) References Cited

U.S. PATENT DOCUMENTS

2009/0202304 A1    8/2009   Koide et al.
2010/0078372 A1*   4/2010   Kerfoot ........................ 210/150

FOREIGN PATENT DOCUMENTS

| JP | A-2004-050167 | 2/2004 |
| JP | A-2008-006367 | 1/2008 |
| JP | A-2008-019644 | 1/2008 |
| JP | A-2008-082023 | 4/2008 |

OTHER PUBLICATIONS

May 16, 2012 Office Action issued in Canadian Patent Application No. 2,732,778.
Mar. 8, 2011 Translation of International Preliminary Report on Patentability issued in International Patent Application No. PCT/JP2009/064249.

(Continued)

*Primary Examiner* — Zakiya W Bates
(74) *Attorney, Agent, or Firm* — Oliff PLC

(57) ABSTRACT

A filter (13) is provided at a tip portion of an injection well (9). A pumping apparatus (5) pumps carbon dioxide stored in a carbon dioxide tank (3). The pumping apparatus (5) feeds carbon dioxide from the carbon dioxide tank (3) into the injection well (9) by means of a pump. In the pumping apparatus, the pressure and temperature of carbon dioxide are maintained at respective predetermined levels or higher by means of a pressure regulation valve, a temperature regulator, etc., whereby carbon dioxide enters a supercritical state. The carbon dioxide having entered a supercritical state is fed in the direction of arrow A through the injection well (9), passes through the filter (13) provided at an end portion of the injection well (9), and is injected into a brine aquifer (11). Carbon dioxide injected into the brine aquifer (11) assumes the form of microbubbles.

4 Claims, 13 Drawing Sheets

(56) References Cited

OTHER PUBLICATIONS

Hitoshi (Gene) Koide, Ziqiu Xue, Carbon microbubbles sequestration: a novel technology for stable underground emplacement of greenhouse gases into wide variety of saline aquifers, fractured rocks and tight reservoirs, *Energy Procedia*, 2009, vol. 1, pp. 3655-3662.

Australian Search Report issued in Australian Application No. 2009280540 dated Nov. 20, 2012.

International Search Report in International Application No. PCT/JP2009/064249; dated Nov. 2, 2009 (with English-language translation).

Feb. 16, 2013 Chinese Office Action issued in Chinese Patent Application No. 200980131283.0 (with English-language translation).

\* cited by examiner

Fig. 1 1 A
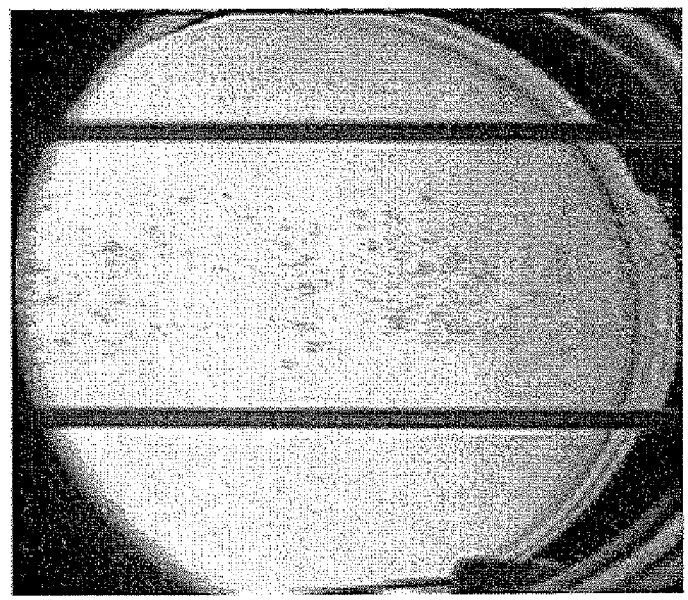
Fig. 1 1 B
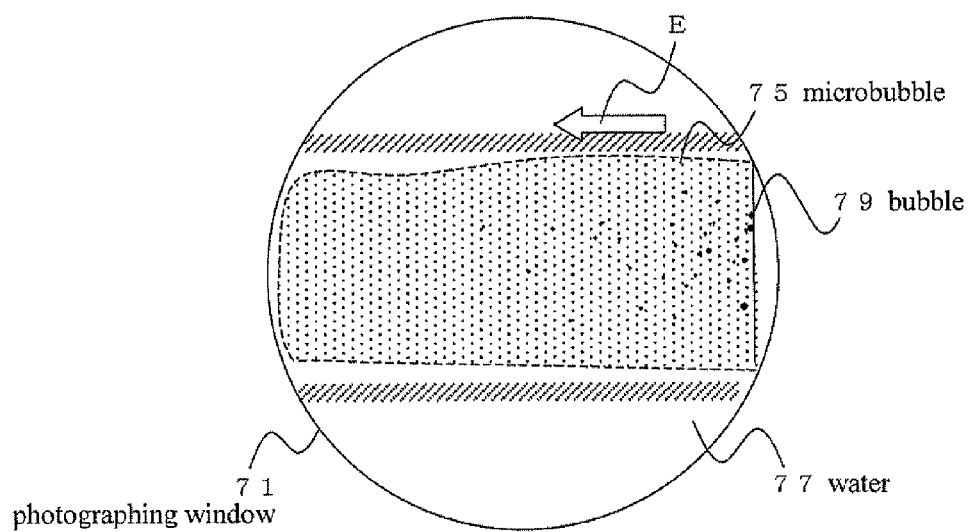

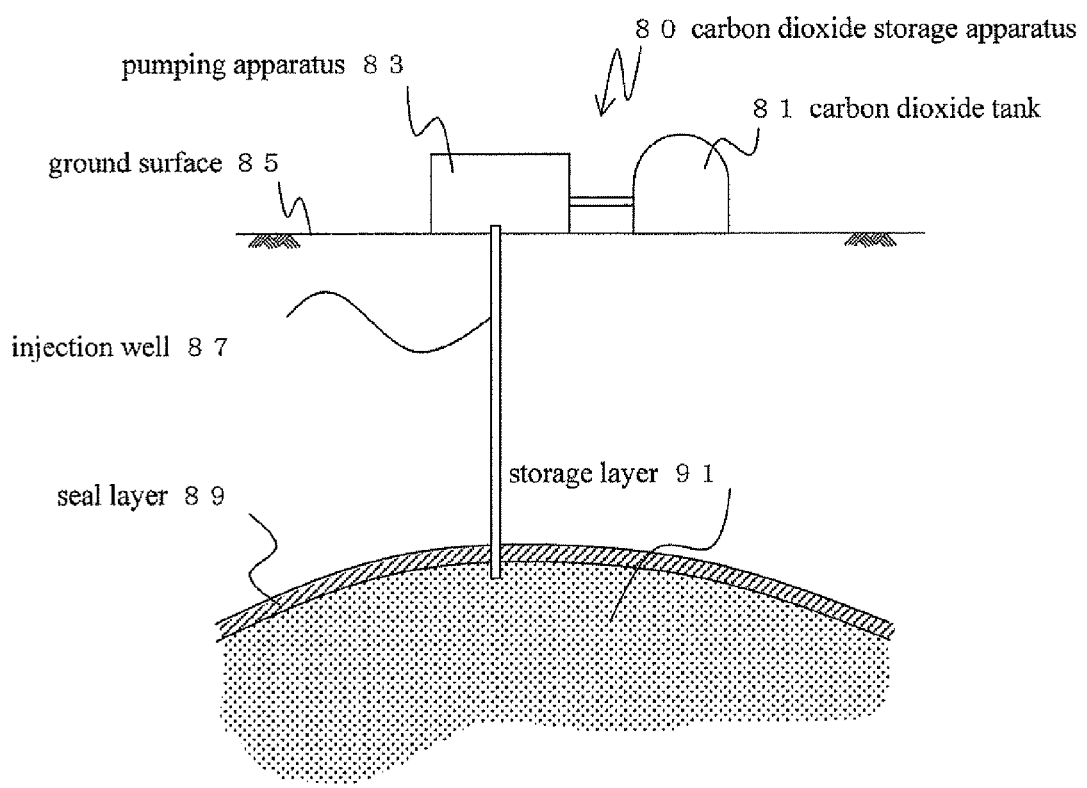

STORING DEVICE FOR STORED SUBSTANCE AND METHOD FOR STORING STORED SUBSTANCE

TECHNICAL FIELD

The present invention relates to an apparatus and method for storing, in an underground brine aquifer, a substance-to-be-stored which includes at least one of carbon dioxide, a substance higher in water solubility than carbon dioxide, and methane, by means of injection of the substance-to-be-stored into the brine aquifer.

BACKGROUND ART

At present, a reduction in emission of carbon dioxide, which is a greenhouse gas, into the atmosphere is urgent. In order to reduce carbon-dioxide emissions, in addition to a method for limiting the generation of carbon dioxide itself, a method for storing carbon dioxide underground has been studied.

An available method for storing carbon dioxide underground in as large an amount as one million tons per year is to inject carbon dioxide into a geological stratum. FIG. 13 shows a carbon-dioxide-storing apparatus 80. An injection well 87, which is a tubular body, is extended to a storage layer 91 where carbon dioxide is to be stored. Carbon dioxide stored in a carbon dioxide tank 81 is injected into the storage layer 91 via the injection well 87 by means of a pumping apparatus 83.

In this case, after injection of carbon dioxide into the storage layer 91, it is desirable that injected carbon dioxide does not exude above ground. Thus, as shown in FIG. 13, a seal layer 89 having an anticlinal structure (upwardly convex form) must be present above the storage layer 91. The seal layer 89 is a layer through which carbon dioxide is unlikely to penetrate; for example, an argillaceous layer.

The seal layer 89 prevents carbon dioxide injected underground from exuding above ground. However, a geological formation having such an upwardly convex seal layer 89 is present only in limited locations; i.e., locations available for application of such a method are limited.

Therefore, there has been studied a method applicable to a location where the seal layer 89 is not of an anticlinal structure, but of a monoclinal structure; specifically, a method for efficiently storing carbon dioxide in groundwater through dissolution of carbon dioxide in formation water present in an underground brine aquifer.

An example of such a method is as follows: carbon dioxide is dispersed in the form of microbubbles in water or seawater, and the resultant water or seawater is dissolved in the sea, thereby disposing of microparticles of carbon dioxide hydrate on the bottom of the ocean (Patent Document 1).

According to another method, formation water is pumped up from an aquifer; carbon dioxide is injected into the water in the form of microbubbles; and the resultant gas-liquid mixed fluid is injected into the aquifer (Patent Document 2, Patent Document 3).

PRIOR ART DOCUMENTS

Patent Documents

Patent Document 1: Japanese Patent Application Laid-Open (kokai) No. 2004-50167
Patent Document 2: Japanese Patent Application Laid-Open (kokai) No. 2008-6367
Patent Document 3: Japanese Patent Application Laid-Open (kokai) No. 2008-19644

SUMMARY OF THE INVENTION

Problems to be Solved by the Invention

However, the method described in Patent Document 1, in which carbon dioxide gas is formed into microbubbles and then hydrated for storage in the form of hydrate particles in the ocean, involves the following problem. Generally, a high pressure in excess of 10 MPa is required for hydrating carbon dioxide having a temperature slightly above 10° C. Thus, utilization of the method can be said to be limited to an environment having a temperature of 10° C. or lower. In an environment having a higher temperature, the method encounters difficulty in efficiently storing carbon dioxide.

A conventional method which uses a swirling-flow generator or the like involves a problem in that apparatus is complicated. In order to generate microbubbles in an underground environment, a simpler structure is required.

According to the methods described in Patent Document 2 and Patent Document 3, formation water contained in an aquifer is once pumped up and is then formed into a gas-liquid mixed state, and the resultant gas-liquid mixed fluid is injected again into the aquifer. Thus, the methods involve the following problems. In addition to an injection well, a lifting well for pumping up formation water therethrough and a lifting pump are required. Accordingly, the entire system becomes extensive, and motive power required for storage increases. Further, injection pressure into the aquifer must be balanced with suction pressure in the lifting well, and a lifting rate and an injection rate must coincide with each other, resulting in a failure to effectively store carbon dioxide.

The present invention has been conceived in view of the above problems, and an object of the present invention is to provide an apparatus and method for storing a substance-to-be-stored underground which injects a substance-to-be-stored directly into an underground brine aquifer and can store the substance efficiently in the brine aquifer. Examples of the substance-to-be-stored include carbon dioxide; and hydrogen disulfide and methane, which are components of flare gas generated in an oil field or the like.

Means for Solving the Problems

To achieve the above object, a first aspect of the present invention provides an apparatus for underground storage of a substance-to-be-stored, characterized by comprising an injection well extending to a brine aquifer; a pumping apparatus for pumping to the injection well a substance-to-be-stored which includes at least one of carbon dioxide, a substance higher in water solubility than carbon dioxide, and methane; and a porous member provided in the vicinity of a tip of the injection well, wherein the substance-to-be-stored pumped into the injection well can be injected into the brine aquifer via the porous member, and the substance-to-be-stored which is injected from the porous member into the brine aquifer is in a supercritical state.

Desirably, in the course of injection of the substance-to-be-stored from the porous member into the brine aquifer, microbubbles of the substance-to-be-stored are generated.

The porous member may be formed through firing of a mixture of ceramic particles and a binder for binding the ceramic particles together; a mode of a pore size distribution is 40 μm or less; and a full width at half maximum of the pore size distribution is 10 μm or less. Alternatively, the porous member may be a sintered filter of stainless steel. The apparatus may further comprise a production well extending to a gas field, an oil field, or oil sand so as to enable collection of gas, petroleum oil, or heavy oil. In this case, water separated from the gas, petroleum oil, or heavy oil obtained from the production well may be mixed with the substance-to-be-stored which is pumped into the injection well, whereby a mixture of the substance-to-be-stored and the water can be injected into the brine aquifer.

According to the first aspect of the present invention, the porous member is provided at a tip portion of the injection well through which a substance-to-be-stored, such as carbon dioxide, is injected. Thus, the substance-to-be-stored can be dissolved efficiently in formation water present in a brine aquifer.

Herein, the porous member refers to a member having a large number of holes extending between front and back surface of the member, such as a member formed by joining a filament-shaped material or a particle-shaped material through sintering or a like process, or a foamed member having communicating spaces formed through expansion or a like process.

Microbubbles of the substance-to-be-stored, which is injected, are generated. This accelerates the dissolution of the substance-to-be-stored in formation water present in a brine aquifer. In particular, when the substance-to-be-stored is in a supercritical state, microbubbles of the substance-to-be-stored can be generated efficiently. When the porous member is a sintered filter of stainless steel, the substance-to-be-stored which passes through the porous member can be dissolved efficiently in a brine aquifer. When the porous member is a porous member formed through firing of a mixture of ceramic particles and a binder for binding the ceramic particles together and having a mode of a pore size distribution of 40 μm or less and a full width at half maximum of the pore size distribution of 10 μm or less, the substance-to-be-stored can be dissolved more efficiently in a brine aquifer. Such a porous member can be formed through firing of a mixture of a binder and ceramic particles having a 50% cumulative particle size of 40 μm or less and an error of 2.5 μm or less in the 50% cumulative particle size. A grindstone formed of fine particles for precision grinding can be used to form such a porous member. Notably, a full width at half maximum of a pore size distribution indicates the following. In a pore size distribution curve of a subject substance expressed by plotting a differential pore volume distribution along the vertical axis and a pore size (logarithm of pore size) along the horizontal axis, a full width at half maximum of a pore size distribution indicates a width between two pore sizes at half of the maximum value of the differential pore volume distribution.

Notably, microbubbles indicate bubbles (including a supercritical state) or liquid droplets each having a diameter of less than 1 mm.

By means of pumping up petroleum oil or the like from a gas field or the like by use of a production well and injecting into a brine aquifer a mixture of a substance-to-be-stored, and water which has been pumped up with petroleum oil or the like, enhanced recovery of petroleum oil or the like can be performed while storing the substance underground.

A second aspect of the present invention provides a method for storage of a substance-to-be-stored in a brine aquifer characterized by comprising the steps of providing a porous member in the vicinity of a tip of an injection well extending to the brine aquifer; and injecting the substance-to-be-stored in a supercritical state into the brine aquifer via the porous member.

Desirably, microbubbles of the substance-to-be-stored are generated in the brine aquifer by the porous member.

According to the second aspect of the present invention, the porous member is provided at a tip portion of the injection well adapted to inject a substance-to-be-stored, such as carbon dioxide, therethrough. Thus, the substance-to-be-stored which passes through the porous member can be dissolved efficiently in a brine aquifer. Further, in the case where microbubbles of the substance-to-be-stored are generated, the dissolution of the substance-to-be-stored in the brine aquifer is accelerated. In particular, in the case where the substance-to-be-stored is in a supercritical state, microbubbles of the substance-to-be-stored can be generated efficiently, whereby the substance-to-be-stored can be dissolved efficiently in the brine aquifer.

Effect of the Invention

The present invention can provide an apparatus and method for storing a substance-to-be-stored which injects a substance-to-be-stored directly into an underground brine aquifer and can store the substance efficiently in the brine aquifer.

BRIEF DESCRIPTION OF THE DRAWINGS

FIG. 11A is a photograph showing a state of generation of the microbubbles 75.

FIG. 11B is a schematic view showing the state of generation of the microbubbles 75.

FIG. 13 is a view showing a carbon dioxide storage apparatus 80.

BEST MODE FOR CARRYING OUT THE INVENTION

Figure 1:
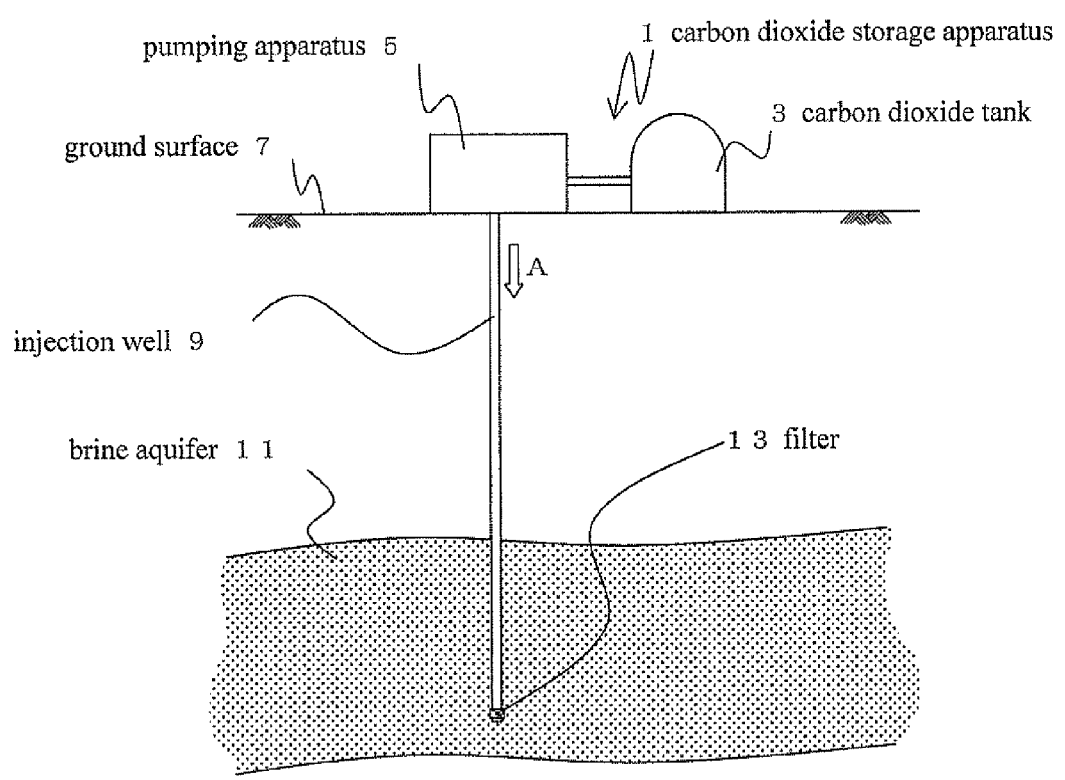
FIG. 1 is a view showing a carbon dioxide storage apparatus 1.

An embodiment of the present invention will next be described in detail. FIG. 1 shows a carbon dioxide storage apparatus 1 according to the present embodiment. The carbon dioxide storage apparatus 1 mainly includes a carbon dioxide tank 3, a pumping apparatus 5, an injection well 9, and a filter 13. The present embodiment is described while mentioning carbon dioxide as a substance-to-be-stored. However, the same is applied to acetylene, ammonia, sulfur dioxide, hydrogen chloride, chlorine, and hydrogen sulfide, which are higher in water solubility than carbon dioxide, as well as methane.

Carbon dioxide emitted from a factory or the like is collected and stored in the carbon dioxide tank 3. In the case where a carbon dioxide source is adjacent to the carbon dioxide tank 3, the carbon dioxide source and the carbon dioxide tank 3 may be directly connected to each other through piping for storage.

The carbon dioxide tank 3 is connected to the pumping apparatus 5. The pumping apparatus 5 includes an unillustrated pump, a pressure regulation valve, another valve, and a temperature regulator. The injection well 9, which is a tubular body, is joined to the pumping apparatus 5. The injection well 9 extends down a ground surface 7 to a brine aquifer 11. The brine aquifer 11 is an underground layer of sand, gravel, etc. An unillustrated seal layer (so-called cap rock) is present above the brine aquifer 11.

The filter 13, which is a porous member, is provided at a tip portion of the injection well 9. The filter 13 is a member formed through firing of, for example, a mixture of ceramic particles and a binder for binding the ceramic particles together, or a sintered filter of stainless steel. The finer the pore size of the filter 13, the more readily microbubbles can be generated. However, since the passage resistance of fluid increases, the pumping apparatus 5 increases in size for increasing the flow rate of carbon dioxide. Increasing the pore size of the filter 13 lowers the passage resistance of fluid; however, the efficiency of generation of microbubbles drops. The filter 13 can have a pore size of, for example, about 20 μm to 40 μm.

Preferably, the filter 13 is formed of a porous member having a mode of a pore size distribution of 40 μm or less and a pore size variation (full width at half maximum) of 10 μm or less. Such a porous member is formed of ceramic particles having a 50% cumulative particle size of 40 μm or less and an error of 2.5 μm or less in the 50% cumulative particle size. Such a porous member is of, for example, a vitrified grindstone formed through firing of a mixture of the above-mentioned particles and a binder (grindstone of #320 or higher specified by JIS mentioned below).

A cumulative particle size of particles and an error in particle size are as specified in "4. Particle Size Distribution" in The Japanese Industrial Standards JIS R6001:1998 and in "8. Electric Resistance Test Method" in JIS R6002:1998 (ISO 8486-1:1996 and ISO 8486-2:1996). The pore size of the filter 13 is measured by use of a mercury porosimeter specified in JIS R1655:2003.

Carbon dioxide stored in the carbon dioxide tank 3 is pumped by means of the pumping apparatus 5. The pumping apparatus 5 pumps carbon dioxide from the carbon dioxide tank 3 into the injection well 9. At this time, by means of the pressure regulation valve, the temperature regulator, etc., the pumping apparatus 5 can pump carbon dioxide at a predetermined pressure and a predetermined temperature. For example, carbon dioxide can be pumped in a supercritical state. In order to bring carbon dioxide into a supercritical state, the temperature of carbon dioxide is made equal to or higher than 31° C. and the pressure thereof is made equal to or higher than 7.4 MPa.

Carbon dioxide, for example, in a supercritical state is transferred through the injection well 9 in the direction of arrow A; passes through the filter 13 provided at an end portion of the injection well 9; and is injected into the brine aquifer 11.

Figure 2:
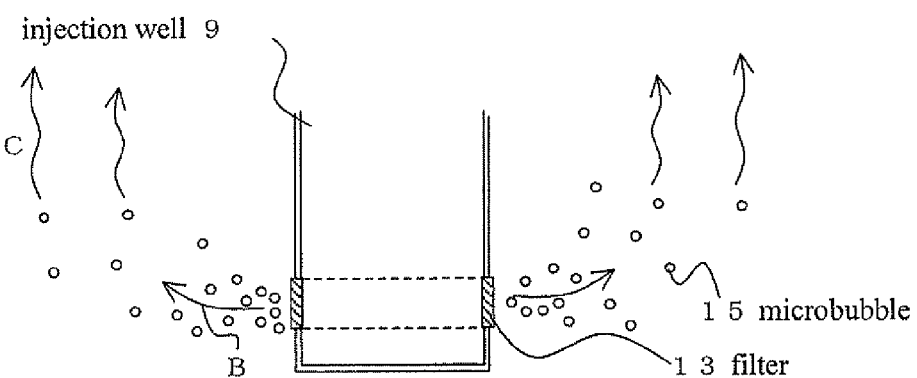
FIG. 2 is an enlarged view showing a filter 13 and its periphery.

FIG. 2 is a sectional view showing a tip portion and its vicinity of the injection well 9. The filter 13 in a ring shape is provided on a side surface of the injection well 9 in the vicinity of the lower end of the injection well 9. The lower end (bottom) of the injection well 9 is closed; thus, carbon dioxide flowing through the injection well 9 is injected into the brine aquifer 11 from the filter 13. When carbon dioxide which has passed through the injection well 9 passes through the filter 13 and is injected into the surrounding brine aquifer 11, carbon dioxide is formed into microbubbles by the effect of the filter 13. In particular, when carbon dioxide in a supercritical state, formation of microbubbles is accelerated.

When and after carbon dioxide is injected in the form of microbubbles into the brine aquifer 11; i.e., in the course of injection (arrow B in FIG. 2) and subsequent ascent (arrow C in FIG. 2), carbon dioxide is dissolved in the brine aquifer 11. By virtue of formation into microbubbles, the residence time in the brine aquifer 11 of carbon dioxide becomes long (since the ascending speed of microbubbles 15 in the brine aquifer 11 is very slow). Also, since a contact area of carbon dioxide with the brine aquifer 11 per unit amount of carbon dioxide can be increased, the dissolution of carbon dioxide in the brine aquifer 11 can progress quite efficiently.

While moving slowly in the brine aquifer 11, carbon dioxide is dissolved in the brine aquifer 11 and chemically reacts with minerals, etc., present around the brine aquifer 11, thereby forming compounds, such as carbonate. Therefore, carbon dioxide can not only be stored in a brine aquifer, but also be fixed in the form of carbonate compounds underground and under the bottom of sea.

Figure 3:
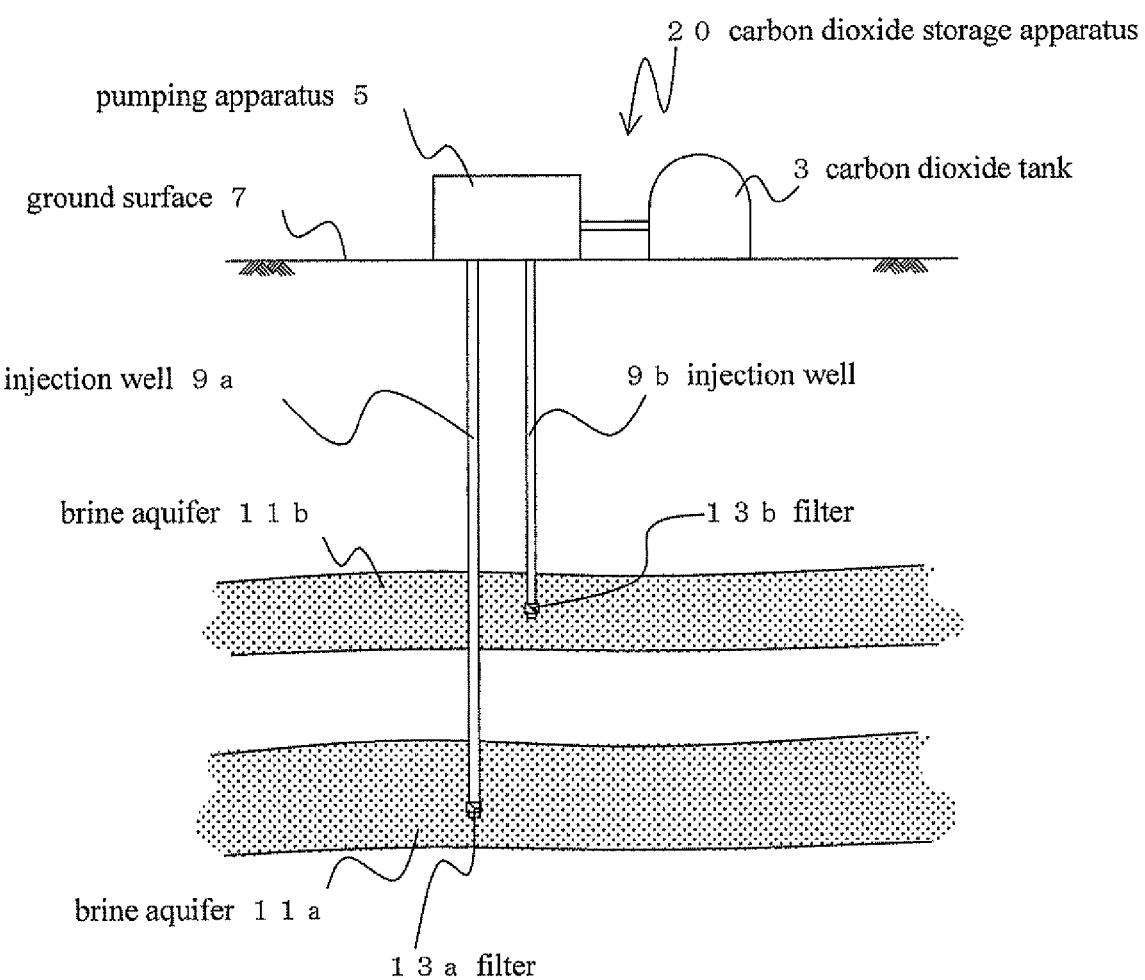
FIG. 3 is a view showing a carbon dioxide storage apparatus 20.

Next, a method for underground storage of carbon dioxide according to another embodiment of the present invention will be described. FIG. 3 shows a carbon dioxide storage apparatus 20. In the following description of the present embodiment, constituent elements similar in function to those of the carbon dioxide storage apparatus 1 shown in FIG. 1 are denoted by like reference numerals, and redundant description thereof is omitted.

The carbon dioxide storage apparatus 20 differs from the carbon dioxide storage apparatus 1 in that a plurality of injection wells 9a and 9b are provided. In the case of alternating sandstone-mudstone layers in which a mudstone layer, whose permeability is low, and a sandstone layer, whose permeability is high, are present alternatingly, the injection wells 9a and 9b are provided in such a manner as to extend to respective sandstone layers where brine aquifers 11a and 11b are present. The carbon dioxide storage apparatus 20 can inject carbon dioxide into the brine aquifers 11a and 11b through the injection wells 9a and 9b simultaneously or individually. Therefore, carbon dioxide can be injected efficiently into the brine aquifers 11a and 11b.

Figure 4:
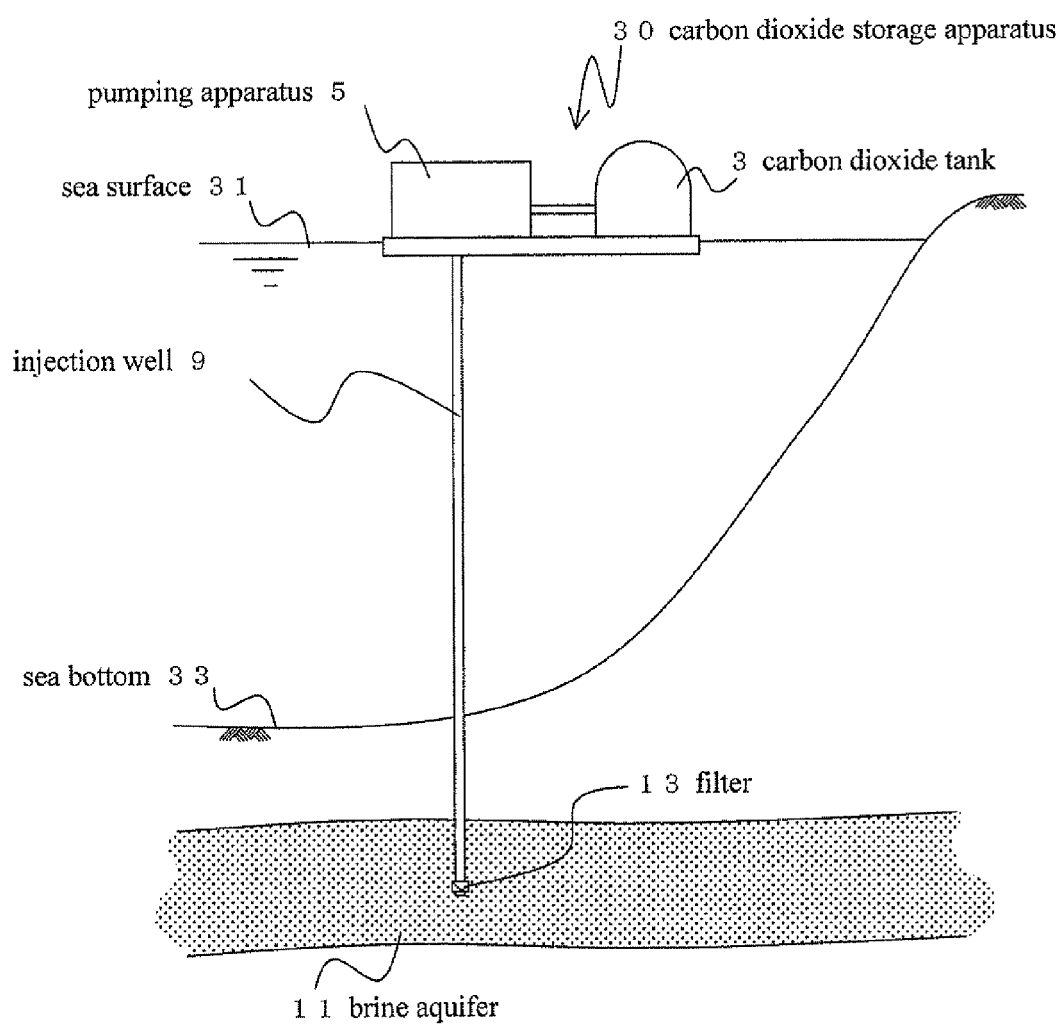
FIG. 4 is a view showing a carbon dioxide storage apparatus 30.

FIG. 4 shows a carbon dioxide storage apparatus 30. The carbon dioxide storage apparatus 30 differs from the carbon dioxide storage apparatus 1 in that the carbon dioxide storage apparatus 30 is disposed on a sea surface 31. In order to store carbon dioxide efficiently into the brine aquifer 11 under a sea bottom 33, the carbon dioxide storage apparatus 30 is provided on the sea surface 31. The carbon dioxide storage apparatus 30 can store carbon dioxide efficiently into the brine aquifer 11 under the sea bottom 33. A ship is used as means for transporting carbon dioxide to the carbon dioxide tank 3. The carbon dioxide tank 3 can be replenished with carbon dioxide directly from the ship.

EXAMPLE

Figure 5:
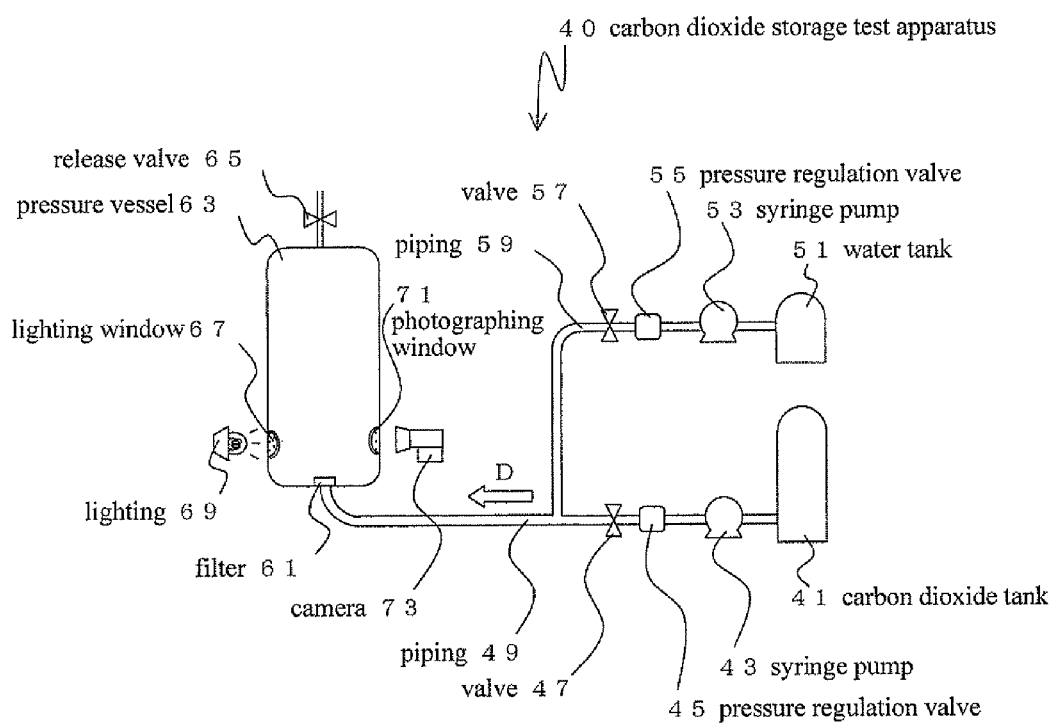
FIG. 5 is a view showing a carbon dioxide storage test apparatus 40.

The method for storing carbon dioxide according to the present invention was verified for a state of generation of microbubbles. FIG. 5 shows a carbon dioxide storage test apparatus 40.

The carbon dioxide storage test apparatus 40 includes a carbon dioxide tank 41, pressure regulation valves 45 and 55, a water tank 51, syringe pumps 43 and 53, and a pressure vessel 63.

Carbon dioxide is stored in the carbon dioxide tank 41. The syringe pump 43, the pressure regulation valve 45, and a valve 47 are connected to the carbon dioxide tank 41 by means of piping 49. The syringe pump 43 pumps carbon dioxide to the pressure vessel 63. Carbon dioxide can be regulated in pressure to an arbitrary value by means of the pressure regulation valve 45. Also, carbon dioxide to be pumped to the pressure vessel 63 can be regulated in temperature to an arbitrary value by means of an unillustrated temperature regulator.

The water tank 51 contains water. The syringe pump 53, the pressure regulation valve 55, and a valve 57 are connected to the water tank 51 by means of piping 59. The syringe pump 53 pumps water to the pressure vessel 63. Similar to carbon dioxide, water can be regulated in pressure to an arbitrary value by means of the pressure regulation valve 55. Also, water to be pumped to the pressure vessel 63 can be regulated in temperature to an arbitrary value by means of an unillustrated temperature regulator.

The piping 59 is joined to the piping 49. Thus, through operation of the valves 47 and 57, carbon dioxide alone or a mixture of carbon dioxide and water can be pumped to the pressure vessel 63 (direction of arrow D in FIG. 5).

A filter 61 is provided at a joint between the pressure vessel 63 and the piping 49. The filter 61 assumes the form of a disk having a diameter of 50 mm and a thickness of 5 mm. The filter 61 can be replaced, so that a test can be conducted while pore sizes are changed.

The pressure vessel 63 has a lighting window 67 and a photographing window 71 provided at opposite sides. The lighting window 67 and the photographing window 71 are transparent windows, so that the conditions of the interior of the pressure vessel 63 can be checked therethrough. An externally disposed lighting 69 illuminates the interior of the pressure vessel 63 through the lighting window 67. A camera 73 is disposed externally of the photographing window 71 located opposite the lighting window 67. The camera 73 can photograph the interior of the pressure vessel 63 illuminated by the lighting 69. The camera 73 is a high-speed camera and provides images showing the conditions of carbon dioxide injected through the filter 61 into the pressure vessel 63.

The pressure vessel 63 is filled with water under a predetermined pressure. The pressure vessel 63 has a release valve 65. The release valve 65 functions to hold the interior of the pressure vessel 63 at a constant pressure even when carbon dioxide or the like is injected into the pressure vessel 63. Specifically, when injected carbon dioxide or the like causes an increase in pressure, water or the like is released from the pressure vessel 63 so as to bring the increased pressure to a regular level. Water in the pressure vessel 63 is a simulated brine aquifer.

By use of the carbon dioxide storage test apparatus 40, the conditions of carbon dioxide injected under various conditions into the pressure vessel 63 were observed. Carbon dioxide to be injected in the pressure vessel 63 was in a liquid state, a gaseous state, and a supercritical state thereof. Stainless steel sintered filters having pore sizes (nominal) of 20 μm and 40 μm and vitrified grindstones having pore sizes (nominal) of 28 μm and 40 μm were used as the filter 61. The stainless steel sintered filter having a pore size (nominal) of 40 μm and the vitrified grindstones having pore sizes (nominal) of 28 μm and 40 μm were measured for pore size distribution by use of a fully automatic pore size distribution measuring device (POREMASTER® 60-GT, product of Quantachrome Instruments). The results of measurement are shown in Table 1

TABLE 1

|  | Median μm | Mode μm | Full width at half maximum μm |
| --- | --- | --- | --- |
| 40 μm SUS sintered filter | 37.9 | 38.4 | 18 |
| 28 μm vitrified grindstone | 17.3 | 17.8 | 6 |
| 40 μm vitrified grindstone | 30.0 | 28.5 | 9 |

Figure 6:
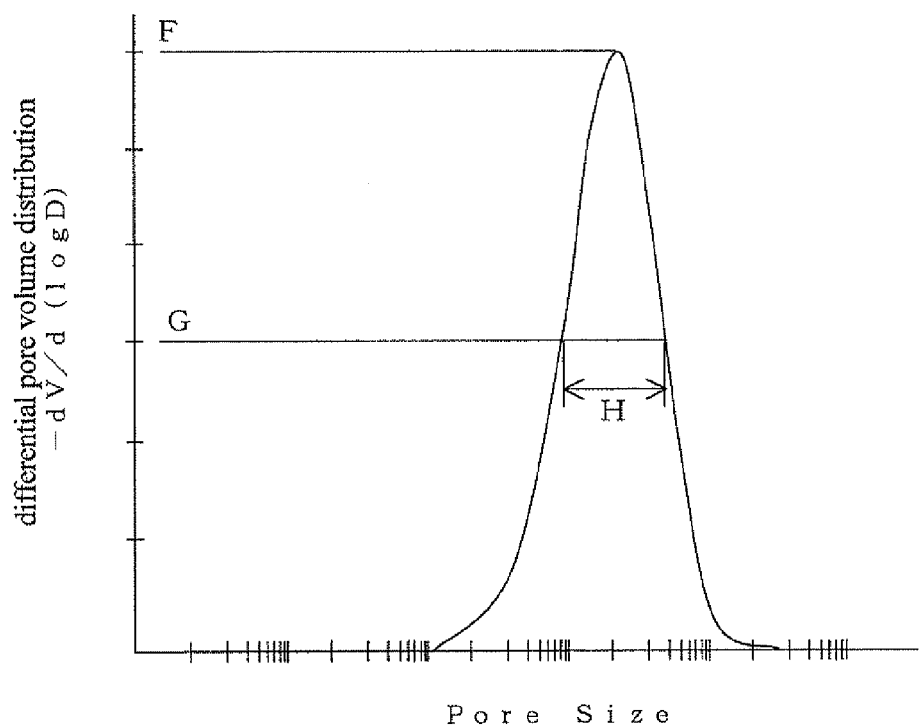
FIG. 6 is a graph showing a pore size distribution.

As shown in Table 1, the vitrified grindstones have pore sizes slightly smaller than nominal sizes. Particularly, as compared with the stainless steel sintered filter, the vitrified grindstones are considerably smaller in full width at half maximum. That is, the vitrified grindstones are small in pore size variation; in other words, the vitrified grindstones are superior in pore size uniformity to the stainless steel sintered filter. Notably, a full width at half maximum of a pore size distribution indicates the following. In a pore size distribution curve of a subject substance expressed by plotting a differential pore volume distribution along the vertical axis and a pore size (logarithm of pore size) along the horizontal axis, a full width at half maximum of a pore size distribution indicates a width between two pore sizes at half of the maximum value of the differential pore volume distribution. FIG. 6 schematically shows a pore size distribution. As shown in FIG. 6, a pore size distribution can be obtained by plotting a differential pore volume distribution ($-dV/d(\log D)$) along the vertical axis and a pore size along the horizontal axis. In view of measuring-point variation and the logarithmic plotting of pore size, the differential pore volume distribution is a value obtained by dividing a differential pore volume dV, which is a pore volume for each pore size, by a differential value d (log D) of logarithmic pore size. The full width at half maximum in the example shown in FIG. 6 is a distribution width H of a distribution curve at half G of maximum differential pore volume distribution F of the distribution curve. By use of vitrified grindstone, pore size variation (full width at half maximum) can be rendered substantially 10 μm or less. In order to attain such a pore size variation, particles of ceramic (alumina or titanium oxide) having a 50% cumulative particle size of 40 μm or less and an error of 2.5 μm or less in the 50% cumulative particle size were used. The employed vitrified grindstones are alumina grindstones produced by Matsunaga Stone Co., Ltd.

Figure 7:
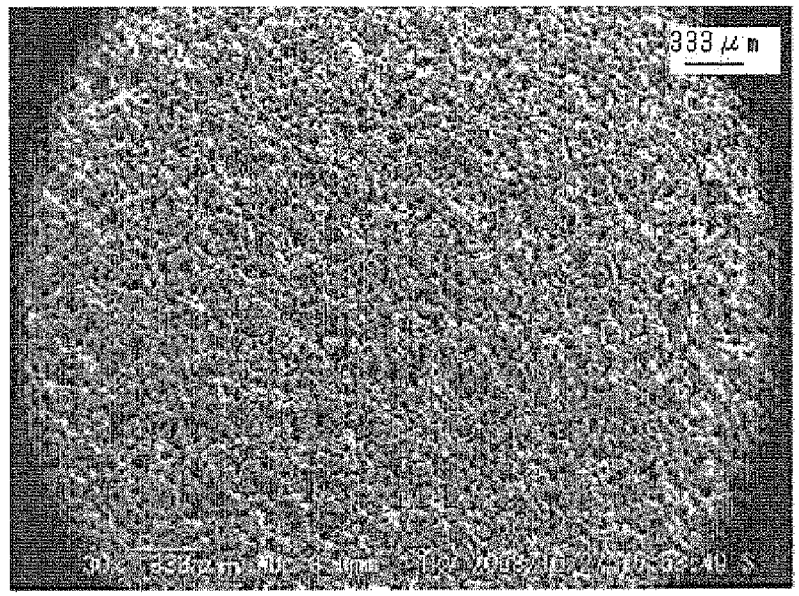
FIG. 7A is a scanning electron micrograph showing the surface of a vitrified grindstone filter.
FIG. 7B is a scanning electron micrograph showing the surface of a stainless steel filter.
Figure 7:
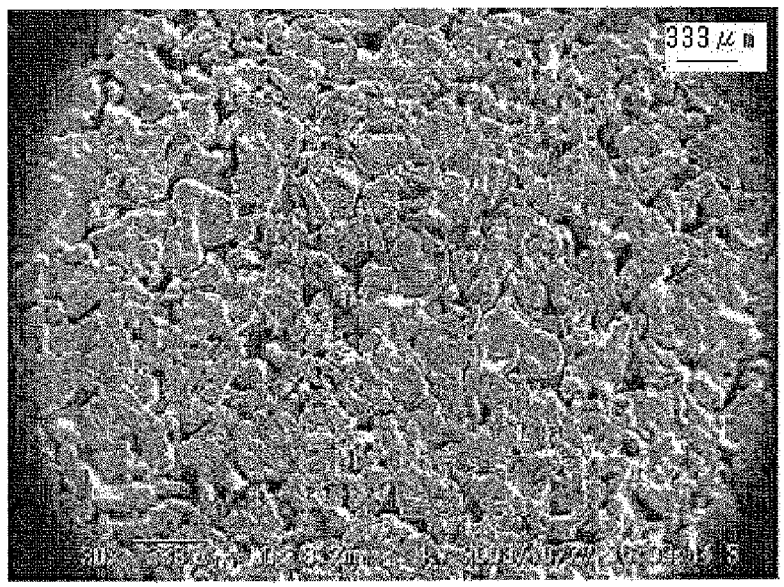

FIG. 7A is a photograph of the surface of the vitrified grindstone having a pore size of 40 μm. FIG. 7B is a photograph of the surface of the stainless steel sintered filter having a pore size of 40 μm. As mentioned above, even in the case of the same pore size (nominal), the vitrified grindstone is smaller in pore size variation as compared with the stainless steel sintered filter. This is because the vitrified grindstone is small in particle size variation (2.5 μm or less).

In addition to carbon dioxide alone, a mixture of carbon dioxide and water was also checked for conditions of the mixture injected into the pressure vessel 63. As the state of carbon dioxide injected into the pressure vessel 63, the degree of generation of microbubbles was observed.

Table 2 shows test conditions and results. In Table 2, "flow rate," "temperature," and "pressure" indicate the flow rate, temperature, and pressure of carbon dioxide to be injected into the pressure vessel. The state of carbon dioxide at that time is the $CO_2$ state. In the column "$CO_2$ state," "supercritical" indicates carbon dioxide in a supercritical state. Further, in the column "filter type," "SUS sintered" indicates a stainless steel sintered filter, and "grindstone" indicates a vitrified grindstone. In the column "filter," values indicate pore sizes (nominal) of filters. In the column "mixture of water," "mixed" indicates that water from the water tank 51 is mixed with carbon dioxide, and is then injected into the pressure vessel 63.

TABLE 2

| Test No. | | Flow rate ml/min | Temp. °C. | Pressure MPa | $CO_2$ state | Filter type | Filter μm | Mixing of water | Generation of microbubbles |
|---|---|---|---|---|---|---|---|---|---|
| 1 | Comparative Example | 2 | 24 | 5 | Gas | SUS sintered | 20 | Not mixed | C |
| 2 | Comparative Example | 2 | 24 | 8 | Liquid | SUS sintered | 20 | Not mixed | C |
| 3 | Present invention | 2 | 40 | 10 | Supercritical | SUS sintered | 20 | Not mixed | A |
| 4 | Present invention | 10 | 40 | 10 | Supercritical | SUS sintered | 20 | Not mixed | A |
| 5 | Present invention | 20 | 40 | 10 | Supercritical | SUS sintered | 20 | Not mixed | A |
| 6 | Present invention | 40 | 40 | 10 | Supercritical | SUS sintered | 20 | Not mixed | A |
| 7 | Present invention | 10 | 40 | 10 | Supercritical | SUS sintered | 20 | Mixed | B |
| 8 | Present invention | 20 | 40 | 10 | Supercritical | SUS sintered | 20 | Mixed | A |
| 9 | Present invention | 40 | 40 | 10 | Supercritical | SUS sintered | 20 | Mixed | B |
| 10 | Comparative Example | 2 | 24 | 5 | Gas | SUS sintered | 40 | Not mixed | C |
| 11 | Comparative Example | 2 | 24 | 8 | Liquid | SUS sintered | 40 | Not mixed | C |
| 12 | Present invention | 2 | 40 | 10 | Supercritical | SUS sintered | 40 | Not mixed | A |
| 13 | Present invention | 5 | 40 | 10 | Supercritical | SUS sintered | 40 | Not mixed | A |
| 14 | Present invention | 10 | 40 | 10 | Supercritical | SUS sintered | 40 | Not mixed | A |
| 15 | Present invention | 1 | 40 | 8 | Supercritical | Grindstone | 28 | Not mixed | S |
| 16 | Present invention | 5 | 40 | 8 | Supercritical | Grindstone | 28 | Not mixed | S |
| 17 | Present invention | 10 | 40 | 8 | Supercritical | Grindstone | 28 | Not mixed | S |
| 18 | Present invention | 1 | 40 | 10 | Supercritical | Grindstone | 28 | Not mixed | S |
| 19 | Present invention | 5 | 40 | 10 | Supercritical | Grindstone | 28 | Not mixed | S |
| 20 | Present invention | 10 | 40 | 10 | Supercritical | Grindstone | 28 | Not mixed | S |
| 21 | Present invention | 1 | 40 | 8 | Supercritical | Grindstone | 40 | Not mixed | S |
| 22 | Present invention | 5 | 40 | 8 | Supercritical | Grindstone | 40 | Not mixed | S |
| 23 | Present invention | 10 | 40 | 8 | Supercritical | Grindstone | 40 | Not mixed | S |
| 24 | Present invention | 1 | 40 | 10 | Supercritical | Grindstone | 40 | Not mixed | S |
| 25 | Present invention | 5 | 40 | 10 | Supercritical | Grindstone | 40 | Not mixed | S |
| 26 | Present invention | 10 | 40 | 10 | Supercritical | Grindstone | 40 | Not mixed | S |

The state of generation of microbubbles was evaluated as follows. Even when bubbles (including those in a supercritical state) or droplets (hereinafter, the term "bubbles" is used regardless of a gaseous state, a liquid state, or a supercritical state thereof) each having a diameter of 1 mm or greater are included, the state of generation of microbubbles was credited with "A" on condition that a large amount of microbubbles each having a diameter of less than 1 mm were generated. Even when most of generated bubbles are 1 mm or greater in diameter, the state of generation of microbubbles was credited with "B" on condition that microbubbles were slightly present. When all of generated bubbles had a diameter equal to or greater than 1 mm, the state of generation of microbubbles was credited with "C." When a larger number of uniform microbubbles were generated as compared with A, the state of generation of microbubbles was credited with "S."

In Table 2, as is apparent from comparison of tests Nos. 1 to 3, in the case where the filter pore size was set to 20 μm and the flow rate was set to 2 ml/min, microbubbles were generated well when carbon dioxide in a supercritical state was injected (test No. 3). Meanwhile, no microbubbles were generated in the case of gaseous carbon dioxide (test No. 1) and in the case of liquid carbon dioxide (test No. 2). In the case of the carbon dioxide in a supercritical state, even when the flow rate was increased to 10 ml-40 ml, microbubbles were generated (tests Nos. 4 to 6).

Figure 8:
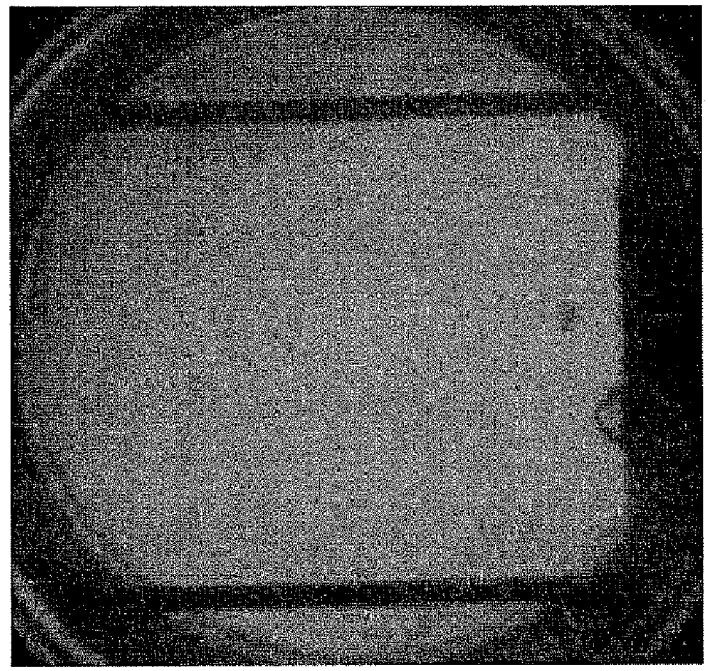
FIG. 8A is a photograph showing a state of generation of microbubbles 75.
FIG. 8B is a schematic view showing the state of generation of the microbubbles 75.
Figure 8:
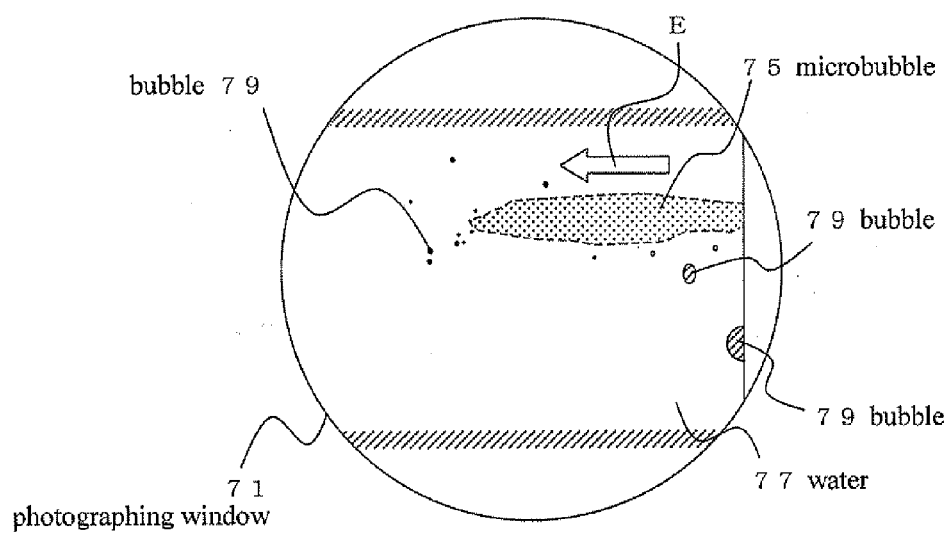

FIGS. 8A and 8B show the state of generation of microbubbles in test No. 5. FIG. 8A shows an image photographed by the camera 73. FIG. 8B is a schematic view of FIG. 8A. In FIGS. 8A and 8B, the right side corresponds to the lower side of the pressure vessel 63, and the left side corresponds to the upper side of the pressure vessel 63.

As shown in FIG. 8B, when carbon dioxide is injected from the lower side (right side in the drawing) of the pressure vessel 63, carbon dioxide is ejected into water contained in the pressure vessel 63 in the direction of arrow E. At this time, although some bubbles 79 were generated, the generation of very fine microbubbles 75 was confirmed. The microbubbles 75 disappeared in the course of travel toward the left side in the drawing (toward the upper side of the pressure vessel 63). This indicates that carbon dioxide in the form of microbubbles was dissolved in water 77.

Figure 9:
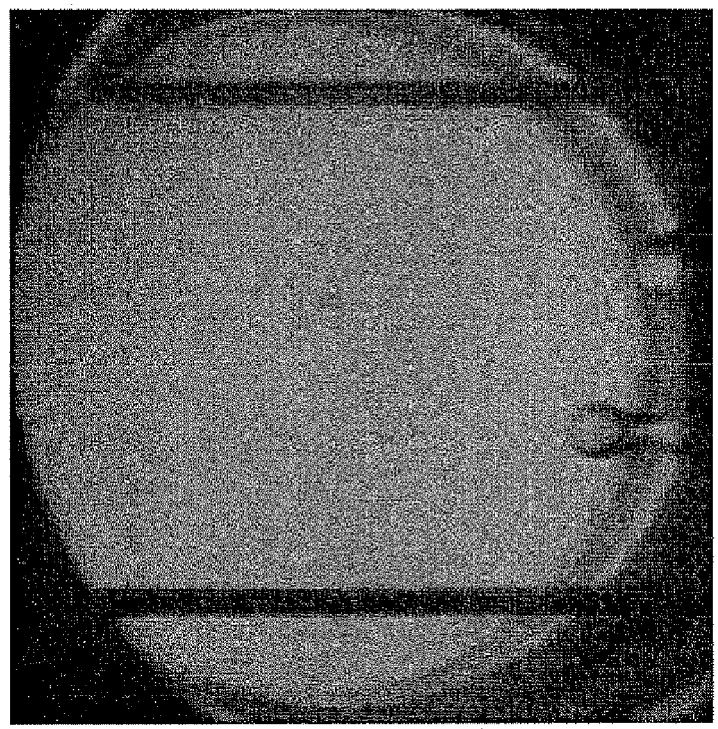
FIG. 9A is a photograph showing a state of generation of bubbles 79 without formation of microbubbles.
FIG. 9B is a schematic view showing the state of generation of the bubbles 79 without formation of microbubbles.
Figure 9:
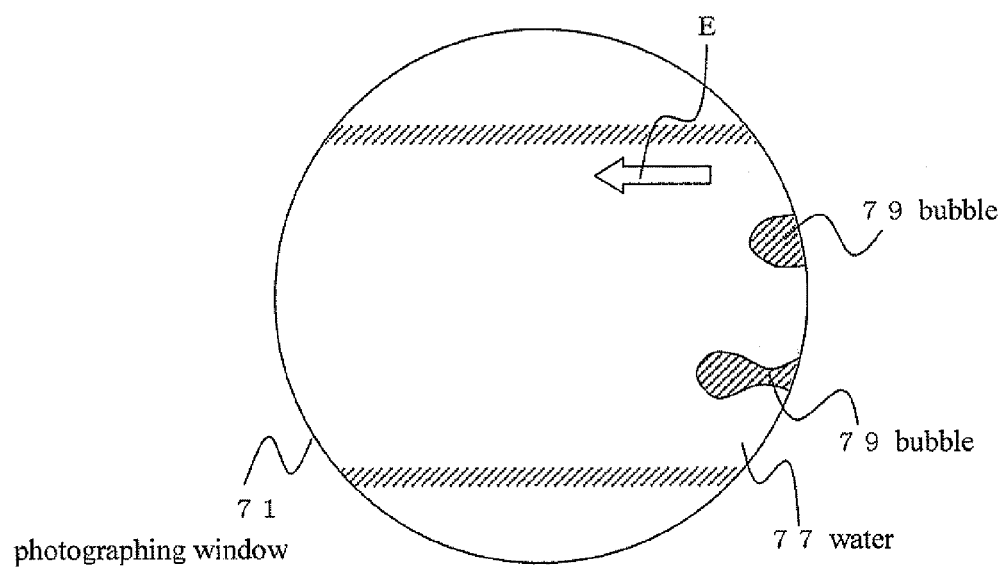

Similarly, FIGS. 9A and 9B show the condition of carbon dioxide in test No. 2. FIG. 9A shows an image photographed by the camera 73. FIG. 9B is a schematic view of FIG. 9A. Arrow E in FIG. 9B indicates the direction of injection of carbon dioxide.

Liquid carbon dioxide was not injected into the water 77 in the form of microbubbles, but was injected in the form of large bubbles 79. Upon release from the filter 61, the bubbles 79 ascended immediately. Therefore, carbon dioxide was hardly dissolved in the water 77.

As shown in Table 2, even when the filter pore size was set to 40 μm as in tests Nos. 10 to 12, in the case of carbon dioxide in a supercritical state, microbubbles were generated. Meanwhile, no microbubbles were generated in the case of gaseous carbon dioxide and in the case of liquid carbon dioxide. In the case of the carbon dioxide in a supercritical state, even when the flow rate was increased to 5 ml-10 ml, microbubbles were generated (tests Nos. 13 to 14).

Figure 10:
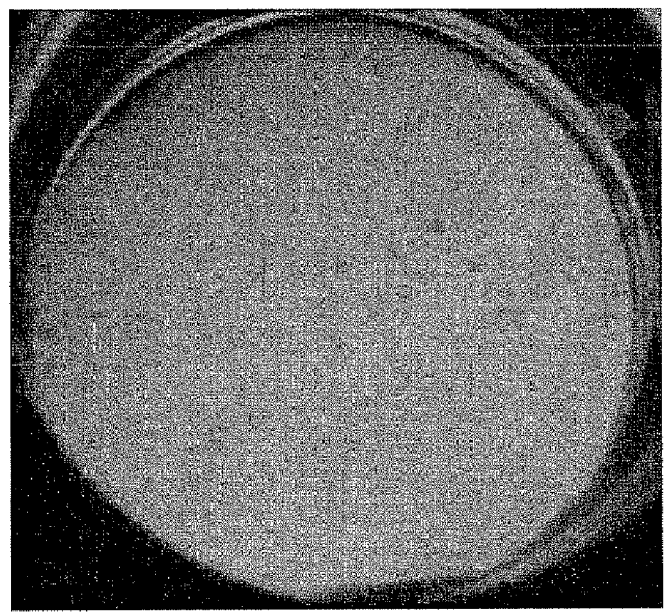
FIG. 10A is a photograph showing a state of generation of the microbubbles 75.
FIG. 10B is a schematic view showing the state of generation of the microbubbles 75.
Figure 10:
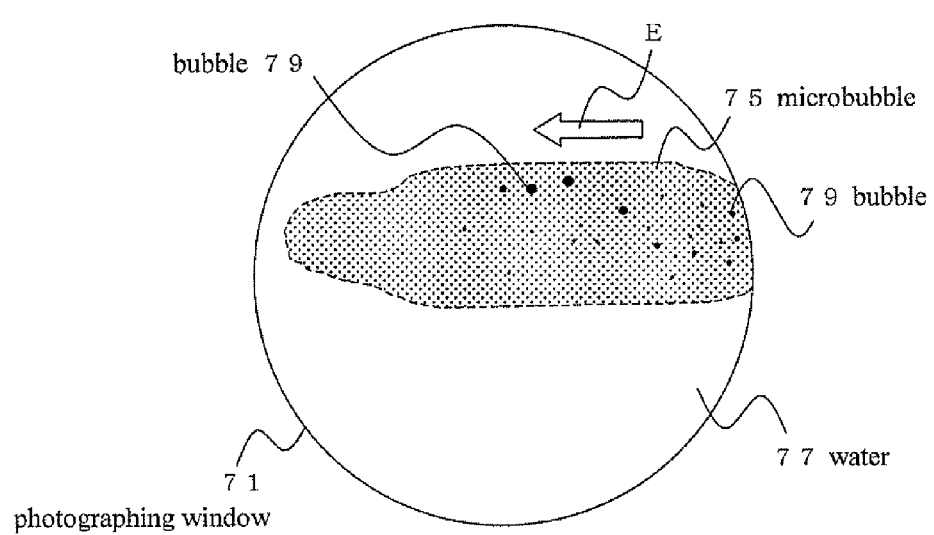

FIGS. 10A and 10B show the state of generation of microbubbles in test No. 14. FIG. 10A shows an image photographed by the camera 73. FIG. 10B is a schematic view of FIG. 10A.

As shown in FIG. 10B, when carbon dioxide was injected in the direction of arrow E, the generation of very fine micro bubbles 75 was confirmed, although slight air bubbles 79 were generated. The microbubbles 75 disappeared in the course of travel toward the left side in the drawing. This indicates that carbon dioxide in the form of microbubbles 75 was dissolved in water 77.

Even in the case where water was mixed as in tests Nos. 7 to 9, in the case of carbon dioxide in a supercritical state, microbubbles were generated. Although generation of microbubbles was somewhat hindered through mixing of water, microbubbles were generated sufficiently at a flow rate of 20 ml/min. In the case where the flow rate was 10 ml/min and the case where the flow rate was 40 ml/min, the amount of generated microbubbles decreased as compared with the case of tests Nos. 4 and 6, respectively. However, a portion of carbon dioxide formed microbubbles.

FIGS. 11A and 11B show the state of generation of microbubbles in test No. 20. FIG. 11A shows an image photographed by the camera 73. FIG. 11B is a schematic view of FIG. 11A.

In the case where a grindstone was used as a filter, more uniform microbubbles were generated in a larger amount as compared with the case where the above-described stainless sintered filter was used. This is because the grindstone filter is small in variation in grain size, and has uniform pore diameters. Since use of a grindstone provides a more uniform pore size distribution as compared with a stainless steel filter, generation of microbubbles is accelerated further.

Figure 12A:
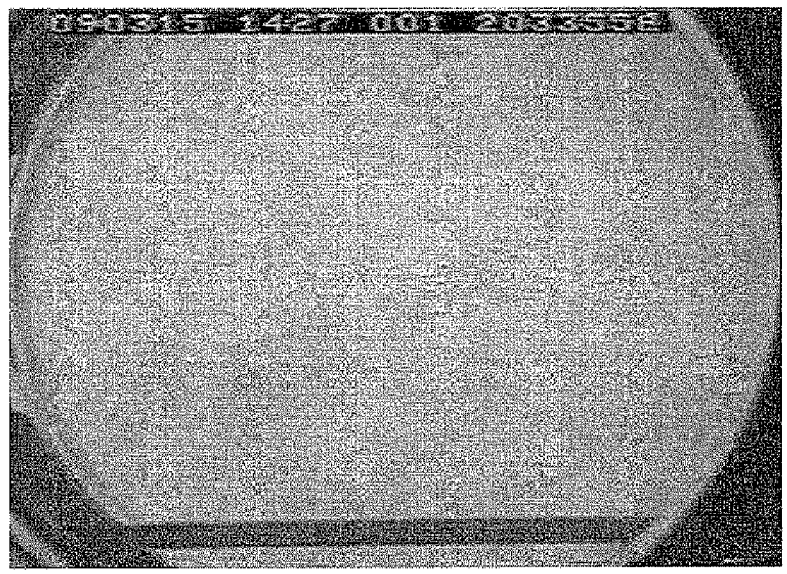
FIG. 12A is a photograph showing a state of generation of the microbubbles 75.
Figure 12B:
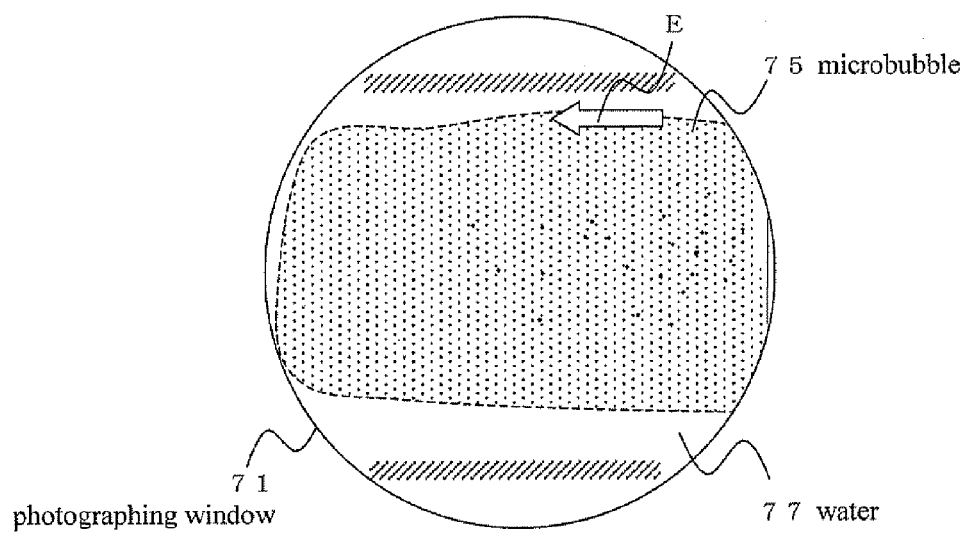
FIG. 12B is a schematic view showing the state of generation of the microbubbles 75.

FIGS. 12A and 12B show the state of generation of microbubbles when carbon dioxide was formed into microbubbles under the conditions of 40° C., 10 MPa, and 7 ml/min with a sandstone layer disposed on the grindstone filter. FIG. 12A shows an image photographed by the camera 73. FIG. 12B is a schematic view of FIG. 12A.

In actual storage of carbon dioxide in a storage layer, the state of generation of bubbles in an aquifer after carbon dioxide ejected from the filter has passed through a sandstone layer is important. Thus, Tako sandstone, which imitates a sandstone layer, was disposed on the filter 61 for studying the state of generation of bubbles from a sandstone layer. As a result, as shown in FIGS. 12A and 12B, even when carbon dioxide passed through the filter 61 and the Tako sandstone disposed on the filter 61, the generation of microbubbles was confirmed. Similarly, in the case of use of Berea sandstone in place of Take sandstone, the generation of microbubbles was also confirmed.

In this manner, when carbon dioxide, in particularly, carbon dioxide in a supercritical state is injected into the water 77 through the filter 61, the microbubbles 75 of carbon dioxide can be readily generated. By means of forming carbon dioxide into microbubbles, carbon dioxide is dissolved efficiently in the water 77. Even in the case of a mixture of water and carbon dioxide in a supercritical state, the mixture injected into the water 77 through the filter 61 is formed into microbubbles. The above embodiments have been described while mentioning carbon dioxide. However, a substance other than carbon dioxide can also be formed into microbubbles by means of injection of the substance into water through a filter in a supercritical state. Particularly, acetylene, ammonia, sulfur dioxide, hydrogen chloride, chlorine, and hydrogen sulfide are higher in water solubility than carbon dioxide under the same temperature and pressure conditions; thus, considerably accelerated dissolution can be expected in storage thereof.

According to the above-described embodiments of the present invention, by means of injecting carbon dioxide in particular in a critical state into a brine aquifer through a filter, which is a porous member, carbon dioxide is formed efficiently into microbubbles in the brine aquifer. Thus, carbon dioxide is dissolved efficiently in the brine aquifer and is fixed underground in the form of carbonate compounds through chemical reaction with components of rock, etc., such as Ca and Mg.

Since the supercritical state of carbon dioxide is wide in terms of applicable conditions as compared with hydrate, reduced limitations are imposed on selection of an injection site. Further, since carbon dioxide can be injected directly into an underground brine aquifer, there is no need to pump up formation water from the underground brine aquifer, so that the apparatus size can be reduced.

While the embodiments of the present invention have been described with reference to the appended drawings, the technical scope of the present invention is not limited to the embodiments. It is apparent that those skilled in the art can easily arrive at various variations or modifications without departing from technical ideas described in claims, and these variations or modifications are to be construed as belonging to the technical scope of the present invention.

For example, by means of providing a production well which extends to a gas field, an oil field, or oil sand, and injecting carbon dioxide or the like underground through an injection well, enhanced recovery of gas, petroleum oil, heavy oil, etc. can be performed through the production well. At this time, after recovery of oil or the like from a mixture of water and oil or the like extracted through a production well, residual water is mixed with carbon dioxide, and the resultant mixture is injected underground, whereby excessively extracted water can be returned underground. Thus, land subsidence or the like is restrained, and carbon dioxide can be injected efficiently into a brine aquifer.

| DESCRIPTION OF REFERENCE NUMERALS | |
|---|---|
| 1, 20, 30: | carbon dioxide storage apparatus |
| 3: | carbon dioxide tank |
| 5: | pumping apparatus |
| 7: | ground surface |
| 9: | injection well |
| 11: | brine aquifer |
| 13: | filter |
| 15: | microbubble |
| 31: | sea surface |
| 33: | sea bottom |
| 40: | carbon dioxide storage test apparatus |
| 41: | carbon dioxide tank |
| 43: | syringe pump |
| 45: | pressure regulation valve |
| 47: | valve |
| 49: | piping |
| 51: | water tank |
| 53: | syringe pump |
| 55: | pressure regulation valve |
| 57: | valve |
| 59: | piping |
| 61: | filter |
| 63: | pressure vessel |
| 65: | release valve |
| 67: | lighting window |
| 69: | lighting |
| 71: | photographing window |
| 73: | camera |
| 75: | microbubble |
| 77: | water |
| 79: | bubble |
| 80: | carbon dioxide storage apparatus |
| 81: | carbon dioxide tank |
| 83: | pumping apparatus |
| 85 | ground surface |
| 87: | injection well |
| 89: | seal layer |
| 91: | storage layer |

The invention claimed is:

1. An apparatus for storing a substance-to-be-stored underground, comprising:
   an injection well extending to a brine aquifer;
   a pumping apparatus for pumping to the injection well a substance-to-be-stored which includes at least one of carbon dioxide, acetylene, ammonia, sulfur dioxide, hydrogen chloride, chlorine, hydrogen sulfide, and methane; and
   a porous member provided in the vicinity of a tip of the injection well, wherein
   the substance-to-be-stored pumped into the injection well can be injected into the brine aquifer via the porous member,
   the substance-to-be-stored which is injected from the porous member into the brine aquifer is in a supercritical state,
   in the course of injection of the substance-to-be-stored from the porous member into the brine aquifer, microbubbles of the substance-to-be-stored are generated, and
   the porous member is formed through firing of a mixture of ceramic particles and a binder for binding the ceramic particles together, a mode of a pore size distribution is 40 µm or less, and a full width at half maximum of the pore size distribution is 10 µm or less.

2. An apparatus for storing a substance-to-be-stored according to claim 1, further comprising a production well extending to a gas field, an oil field, or oil sand, whereby gas, petroleum oil, or heavy oil can be obtained from the production well.

3. An apparatus for storing a substance-to-be-stored according to claim 2, wherein water separated from the gas, petroleum oil, or heavy oil obtained from the production well is mixed with the substance-to-be-stored which is pumped into the injection well, whereby a mixture of the substance-to-be-stored and the water can be injected into the brine aquifer.

4. A method for storing a substance-to-be-stored in a brine aquifer characterized by comprising the steps of:
   providing a porous member in the vicinity of a tip of an injection well extending to the brine aquifer; and
   injecting the substance-to-be-stored in a supercritical state into the brine aquifer via the porous member,
   wherein
   microbubbles of the substance-to-be-stored are generated in the brine aquifer by the porous member, and
   the porous member is formed through firing a mixture of ceramic particles and a binder for binding the ceramic particles together, a mode of a pore size distribution is 40 µm or less, and a full width at half maximum of the pore size distribution is 10 µm or less.

* * * * *